United States Patent [19]

Kuchuk-Yatsenko et al.

[11] 4,417,121

[45] Nov. 22, 1983

[54] METHOD OF FLASH BUTT WELDING

[75] Inventors: Sergei I. Kuchuk-Yatsenko; Mikhail V. Bogorsky; Sergei M. Samotryasov, all of Kiev, U.S.S.R.

[73] Assignee: Institut Elektrosvarki, Imeni E.O. Patona, Kiev, U.S.S.R.

[21] Appl. No.: 330,805

[22] Filed: Dec. 15, 1981

[51] Int. Cl.$^3$ ............................................. B23K 11/04
[52] U.S. Cl. ..................................... 219/104; 219/100
[58] Field of Search ................. 219/97, 100, 101, 102, 219/103, 104

[56] References Cited

U.S. PATENT DOCUMENTS 2,677,037  4/1954  Platte ................................... 219/100
4,352,972  10/1982  Lebedev et al. ..................... 219/100

FOREIGN PATENT DOCUMENTS 1053634  1/1967  United Kingdom .................. 219/97
1162073  8/1969  United Kingdom .

Primary Examiner—B. A. Reynolds
Assistant Examiner—Alfred S. Keve
Attorney, Agent, or Firm—Fleit, Jacobson, Cohn & Price

[57] ABSTRACT

The parts to be welded together are caused to continuously approach each other and their ends are fused by an alternating current, and concurrently an oscillatory motion along the direction of approach is imparted to one of the parts, whereby additional relative movements of the parts towards and away from each other are accomplished. During the stage of a relative movement of the parts being welded together away from each other, the welding voltage is reduced to within the range of 0.7 to 0 of its working value, and during the stage of a relative movement of the parts towards each other, the voltage is restored to its initial value. Reducing the voltage is carried out in a time interval of not less than $\frac{1}{8}$ of the period of the oscillatory motion from the beginning of the relative movement of the parts away from each other, and restoring it, in a time interval of not more than $\frac{1}{8}$ of the period of the oscillatory motion from the beginning of the relative movement of the parts towards each other. The voltage may be reduced to within the same range for the periods when the resistance across contacts exceeds a predetermined value.

2 Claims, 1 Drawing Figure

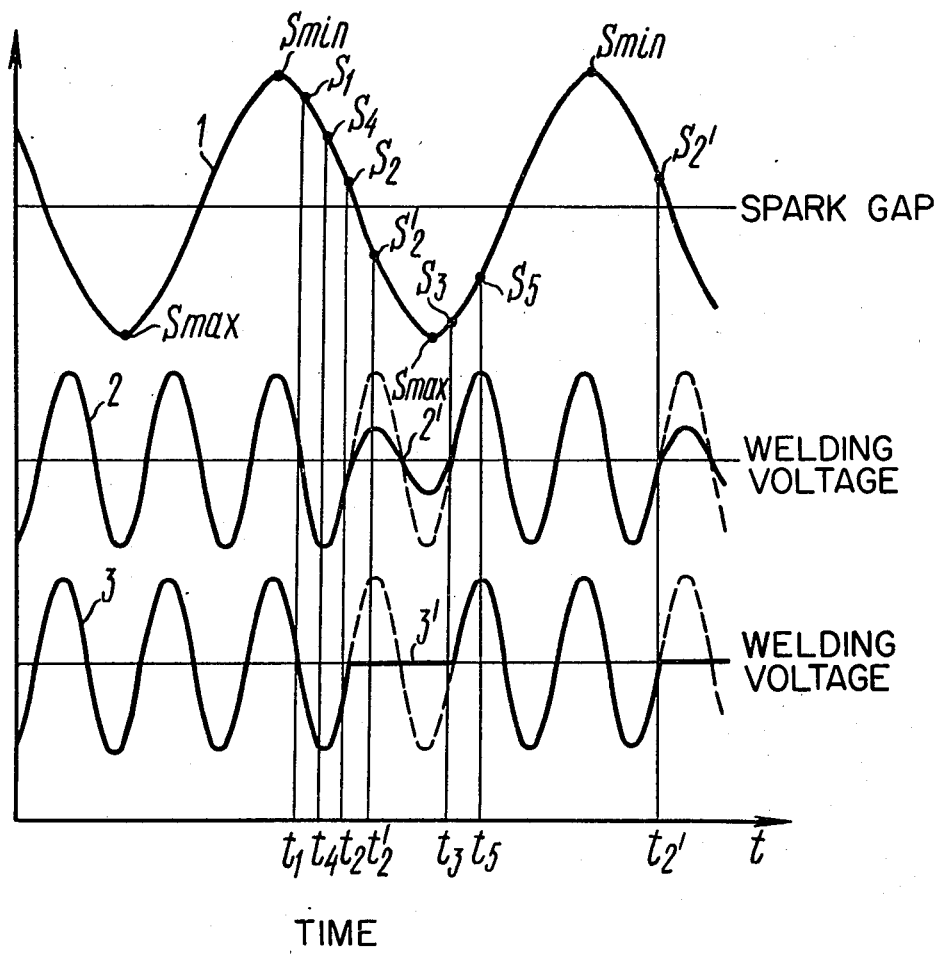

4,417,121

METHOD OF FLASH BUTT WELDING

BACKGROUND OF THE INVENTION

1. Field of the Invention

The present invention relates to the art of flash butt welding and is specifically concerned with a method of flash butt welding, wherein a reciprocating or an oscillatory motion of at least one of the parts being joined together is superimposed on the main translational motion of the parts.

2. Description of the Prior Art

A method of flash butt welding, wherein an additional oscillatory motion along the direction of approach is imparted to one or to both of the parts being joined together finds at present an ever extending commercial application. The method offers the advantages of both the straight flash butt welding (a uniform heating of the metal over the section of the parts welded together, a stable quality) and the resistance butt welding (low fusion loss of the metal, the possibility of utilizing the whole of the installed capacity of welding transformers). The advantages inherent in such a method of welding allow producing welded joints featuring high mechanical properties (with a strength equal to that of the base metal) and to reduce the welding time by a factor of two to three.

This method of welding (British Pat. No. 1,162,073) consists in fusing by an alternating current the ends of the parts being welded together and concurrently causing the parts to continuously approach each other, with imparting to at least one of the parts an oscillatory motion whereby additional relative movements of the parts being welded towards each other and away from each other are accomplished.

The additional oscillatory motion causes the spark gap to vary. A linear variation in the size of the spark gap results in a variation of the resistance in the welding circuit.

As the parts being welded are moved away from each other, the area of contacts therebetween decreases and the resistance increases and while they are being relatively moved towards each other the said area of contacts increases and the resistance decreases.

At the end of the parts being relatively moved away from each other and at the beginning of their being relatively moved towards each other, there occur, generally, explosions of contacts (fusion). The amount of expelled metal, the thermal efficiency, and the rate of fusion depend upon the instantaneous value of the welding voltage at the moment of the explosion of a contact. It should also be pointed out that the probability of explosion of relatively large-size contacts during a relative movement of the parts towards each other is low.

The method disclosed in the British Pat. No. 1,162,073 takes no consideration of the above factors. In accomplishing this prior art method, widely varying instantaneous values of the welding voltage may correspond to a definite resistance across contacts, which lengthens the welding time and reduces the thermal efficiency.

The invention has as its aim to provide a method of flash butt welding, which cuts down the fusion loss of metal, increases the rate of heating, and allows the productive capacity of the butt-welding machines to be raised.

SUMMARY OF THE INVENTION

An object of the present invention is to provide a method of flash butt welding, which allows to cut down the metal loss caused by explosion of contacts.

A further object of the invention is to provide a method of flash butt welding, which ensures a higher rate of heating the metal in the zone of the butt joint.

Still further object of the invention is to provide a method of flash butt welding, which makes it possible to raise the productive capacity of a butt-welding machine.

The above-mentioned and other objects of the invention are attained by the provision of a method of flash butt welding, wherein the ends of the parts being welded together are fused by an alternating current while said parts are caused to continuously approach each other, imparting to at least one of the parts an oscillatory motion along the direction of approach, until the conditions for upsetting have been attained. The oscillatory motion of the parts being welded together causes their additional relative movements towards each other and away from each other. In the course of the above process, according to the invention, the welding voltage is reduced to within the range of 0.7 to 0 of its working value during the stage of a relative movement of the parts being welded together away from each other in a time interval of not less than $\frac{1}{8}$ of the period of the oscillatory motion from the beginning of the relative movement of the parts away from each other, and the voltage is restored to its initial value during the stage of a relative movement of the parts being welded together towards each other in a time interval of not more than $\frac{1}{8}$ of the period of the oscillatory motion from the beginning of the relative movement of the parts towards each other, or the welding voltage is reduced to within said range for the periods when the resistance across contacts exceeds a predetermined value.

Reducing the welding voltage to within said range in a predetermined time interval after the beginning of a relative movement of the parts being welded away from each other and restoring the voltage to its initial value in a predetermined time interval after the beginning of a relative movement of the parts towards each other or reducing the welding voltage for the periods when the resistance across contacts exceeds a predetermined value precludes the possibility of explosion of relatively large contacts, although contacts of a relatively small size will explode. Consequently, the explusion of metal (the unrecoverable losses of metal and heat) will diminish. The allowance for fusion will be reduced. Inasmuch as a heated metal is expelled as a result of explosion of contacts, diminishing the metal loss will raise the thermal efficiency. The heating of the parts being welded will proceed at a higher rate, which will eventually result in reducing the welding time and raising the productive capacity of butt-welding machines.

BRIEF DESCRIPTION OF THE DRAWINGS

The invention will now be explained by a detailed description thereof with reference to the accompanying drawing which is a graph of oscillatory movements of the platen of a welding machine. In the graph, points $S_{min}$ correspond to the minimum spark gap, and points $S_{max}$, to the maximum one.

DETAILED DESCRIPTION OF THE PREFERRED EMBODIMENT OF THE INVENTION

Curves 2, 2', 3, and a straight portion 3' graphically represent the instantaneous values of the welding voltage with the following amplitudes or peak values: for the curve 2, $U_2$; for the curve 2', $U_2'$; for the curve 3, $U_2$; and for the portion 3', $U_3=0$.

As the spark gap increases (on the curve 1, from the points $S_{min}$ to the point $S_{max}$), the resistance across the contacts between the parts rises, while both the amount and the size of the contacts decrease.

Beginning from some time moment $t_2$ (which is fairly accurately determined for specific welding section and welding voltage with the aid of an oscilloscope), the spark gap $S_2$ and the size of the contacts are such that the contact will explode. The loss of metal and of the heat accumulated therein will depend on the size of the exploded contact.

To cut down the loss, the welding voltage whose peak value $U_m$ is equal to $U_2$ (curve 2, $U_m=U_2$) is at the time moment $t_2$ either reduced to such a value (curve 2', $U_m=U_2'$) at which only a small contact can explode at the time moment $t_2$ (the point $S_2'$ on the curve 1), or is completely cut off. As the parts being welded together move relatively towards each other, the spark gap decreases and fusion of relatively small contacts at a reduced voltage ($U_m=U_2'$) takes place. By the time moment $t_3$, the area of developing contacts increases to such an extent that a very high instantaneous voltage is needed to fuse out such a contact. At this moment, the voltage is restored to the initial value (curve 2, $U_m=U_2$; $U_2>U_2'$).

The experience has demonstrated the expedience of reducing the voltage to within the range of 0.7 to 0 of its working value, depending on the section of the parts and the capacity of the welding equipment.

As the heating of the parts being welded together in the course of fusion of the voltage of $U_m=U_2$ becomes higher, there arises a possibility of explosion also of a larger contact than that conditioned by the displacement $S_2$.

At this point, the resistance across the contacts at the moment of reducing or cutting off the voltage will be somewhat lower, since it depends on the time of the welding from the beginning thereof, and hence the predetermined value of the resistance will drop in the course of the welding time.

This is shown in the graph by that as the heating becomes higher, the voltage is reduced at the time moment $t_1$.

Using the above-described techniques makes it possible to raise the productive capacity, not only owing to cutting down the heat and metal losses, but also through setting a high welding voltage at the moments when the contacts are large and the resistance is low, whereas the prior art methods of welding at an increased voltage allow no substantial increase of the heating, since this causes explosion also of relatively large-size contacts.

An experimental test of the method of the invention has shown the possibility of reducing the welding time by 20-30%.

The method of the invention may be accomplished without a current measurement of the resistance across the contacts. In this case, the welding resistance is reduced to within said range at the time moment $t_4$ when the possibility of explosion of the contacts at a spark gap $S_4$ arises. The time or time interval $t_4$ constitutes not less than ⅛ of the period of the oscillatory motion from the beginning of a relative movement of the parts being welded away from each other. The voltage is restored to its initial value during the stage of a relative movement of the parts towards each other at a time interval $t_5$ when the spark gap is equal to $S_5$. The time $t_5$ amounts to not more than ⅛ of the period of the oscillatory motion from the beginning of the relative movement of the parts towards each other, when the set working voltage is needed to fuse out relatively large contacts.

Presented below are examples of a specific accomplishment of the method of the invention.

The extent of reducing the voltage depends on the area of the welding section, on the capacity of the welding machine, on the short-circuit resistance of the machine, and on the material of the parts being welded together.

At a laboratory, austenitic steel rods 40 mm in dia were welded together by the method of the invention in a machine of 150 kVA capacity and with a short-circuit resistance of $60 \cdot 10^{-6} \Omega$; the frequency of the oscillatory movements was of 30 Hz. The voltage was during the above-specified periods reduced to 0 V. The welding time was of 5-6 s as against 10 s in welding without reducing the voltage.

Rails (with a welding section area of 8,650 mm²) were welded together by the method of the invention in a 200-kVA machine with a short-circuit resistance of $90 \cdot 10^{-6} \Omega$; with the frequency of the oscillatory movements being of f=25 Hz.

The welding voltage was during the above-specified periods reduced to 0.7 of the intitial one. The welding time was of 60 s as against 90 s in welding without reducing the voltage. The welding allowance was reduced by 6 mm.

Low-carbon steel pipes with a cross-sectional area of 4,000 mm² were welded together by the method of the invention in a 150-kVA machine with a short-circuit resistance of $80 \cdot 10^{-6} \Omega$ with a frequency of the oscillatory movements of f=16 Hz.

As a resistance on the order of $120 \cdot 10^{-6} \Omega$ had been reached, the voltage was during each period of the oscillatory movements reduced to b 0.4 of its initial value. The welding time was of 50 s as against 75 s in welding without reducing the voltage.

What is claimed is:

1. A method of flash butt welding, which comprises fusing by an alternating current the ends of the parts being welded together, concurrently causing the parts to continuously approach each other, and imparting to at least one of the parts an oscillatory motion along the direction of approach, thereby causing additional relative movements of the parts being welded together towards each other and away from each other, reducing the welding voltage to within the range of 0.7 to 0 of its working value during the stage of a relative movement of the parts being welded together away from each other in a time interval of not less than ⅛ of the period of the oscillatory motion from the beginning of the relative movement of the parts away from each other, and restoring the voltage to its initial value at the stage of a relative movement of the parts being welded together towards each other in a time interval of not more than ⅛ of the period of the oscillatory motion from the beginning of the relative movement of the parts towards each other.

2. A method of flash butt welding, which comprises fusing by an alternating current the ends of the parts being welded together, concurrently causing the parts to continuously approach each other, and imparting to at least one of the parts an oscillatory motion along the direction of approach, thereby causing additional relative movements of the parts being welded together towards each other and away from each other, and reducing the welding voltage to within the range of 0.7 to 0 of its working value for the periods when the resistance across contacts exceeds a predetermined value.

* * * * *